Sept. 26, 1950    J. R. WINTER, JR    2,523,489

ROCKER ARM

Filed March 10, 1945

INVENTOR.
John R. Winter, Jr.
BY
Harness, Dickey & Pierce
ATTORNEYS.

Patented Sept. 26, 1950

2,523,489

UNITED STATES PATENT OFFICE 2,523,489

ROCKER ARM

John R. Winter, Jr., Detroit, Mich., assignor, by direct and mesne assignments, to John R. Winter, Sr., Detroit, Mich.

Application March 10, 1945, Serial No. 582,039

6 Claims. (Cl. 184—6)

The invention relates to rocker arms and it has particular relation to the lubrication thereof.

The present invention embodies certain features of construction embodied in my copending application for patent, Serial No. 545,597, filed July 19, 1944, and with respect to the lubrication, it embodies certain features broadly incorporated in my copending application for patent, Serial No. 560,532, filed October 27, 1944, now Patent Number 2,509,661, issued April 25, 1950.

One object of the present invention is to provide an improved type of rocker arm having an efficient means for controlling the flow of lubricant to one or both ends of the arm.

Another object of the invention is to provide an improved type of lubricant control means particularly adapted for use in connection with one-piece arms such as arms made from metal forgings or castings.

Another object of the invention is to provide an efficient, variable means for controlling the flow of lubricant in a laminated type of rocker arm, such as one made from a stamping or stampings.

Other objects of the invention will become apparent from the following specification, from the drawings relating thereto, and from the claims hereinafter set forth.

For a better understanding of the invention, reference may be had to the drawings wherein.

Figure 1:
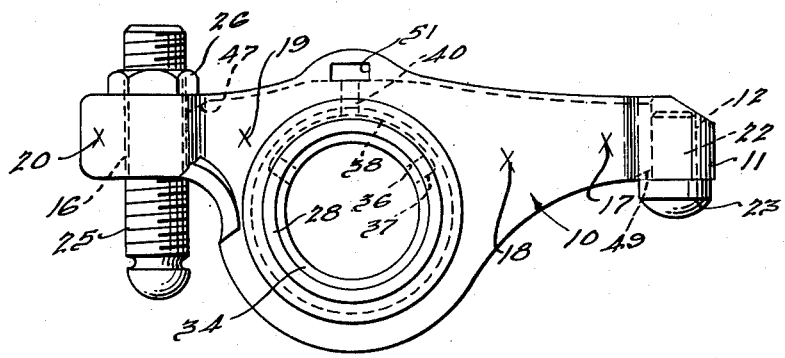
Figure 1 is a side elevational view illustrating a rocker arm constructed according to one form of the invention.
Figure 2:
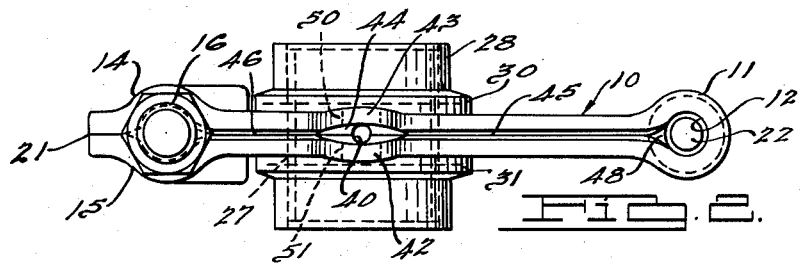
Fig. 2 is a plan view of the arms shown by Fig. 1.

Referring to Figs. 1 and 2, the arm proper comprises a stamping 10 which is folded or bent intermediate its ends to form a pair of laminations and a generally cylindrical end 11 having an opening 12. At the opposite end of the arm, the laminations are shaped to provide semi-cylindrical portions 14 and 15 and these portions jointly form a second opening 16. The laminations may be welded at the points indicated at 17, 18, 19, and 20 so as to obtain a rigid laminated structure, but manifestly the points of welding may be varied as found most desirable. Instead of the spot weld 20 or in conjunction therewith, it is preferable also to carbon arc or otherwise suitably weld the left ends of the two laminations along the vertical edges indicated at 21 so as positively to prevent separation of the laminations to the left of the opening 16.

A pin 22 having a head 23 is removably press fitted into the opening 12, and it is evident that this pin may be replaced if at any time it is necessary, by driving the pin out of the opening and then inserting a new pin. The opening 16 at the other end of the arm is threaded and receives a threaded stud 25 which is adjustably locked in position by a lock nut 26 at the upper side of the arm. It will be understood that the arm oscillates during use and that a moving part engages one end of the arm to move it while the other end of the arm engages a spring pressed valve stem.

Intermediate its ends the arm has an opening 27 and a tubular element 28 is provided in this opening and is locked to the arm by forming outwardly bulbed heads 30 and 31 engaging opposite sides of the arm. A bearing sleeve 34 is provided within the element 28 and the sleeve receives a tubular shaft (not shown). Oil is supplied to the interior of the shaft and reaches the inner surface of the sleeve 34 by means of radial openings in the shaft. Openings 36 and 37 in the sleeve 34 and in the tubular element 28, respectively, lead to a circumferentially extending groove 38 formed between the edges of the laminations and around the opening 27 therein, and this groove communicates with an upwardly extending opening 40 leading to the upper edge of the arm. Generally, the arm so far described corresponds to that embodied in copending application for patent, Serial No. 545,597, and the parts may be manufactured and assembled in substantially the same manner. It should be understood from the description and also from the copending application for patent mentioned that lubricant supplied to the interior of the sleeve 34 flows through the groove 38 and upwardly through the opening 40 to the upper edge of the arm.

For controlling the flow of lubricant to the opposite ends of the arm, the laminations of the arm are formed with upwardly directed projections or ears 42 and 43, respectively, and these projections or ears extend substantially past opposite sides of the opening 40. They are bent or spread apart to provide a V-shaped passage 44 allowing lubricant to flow towards opposite ends of the arm from the opening 40 and it is evident that the amount the projections or ears are bent apart will govern the size of the passage 44 and therefore, the amount of oil that will flow through the passage.

The passage 44 between the ears 42 and 43 merges at its ends into grooves 45 and 46 in the upper edge face of the arm, and which are located at the junction of the laminations. These shallow grooves respectively lead to opposite ends of the arms so as to lubricate the ends of pin 23 and stud 25, and the parts engaged thereby. It should be noted that the left end of the groove 46 is enlarged as indicated at 47 in Fig. 1 so as to enlarge that part of the groove overlapped by the nut 26, and this enlargement may be effected by any suitable operation, as for instance by swaging operation. This provides a larger slot through which lubricant may flow under the nut and avoid a condition where the lower face of the nut would undesirably restrict or prevent flow of lubricant after it reaches the end of the groove. Also it will be noted that the right end of groove 45 leads to a vertical space 48 formed in bending the stamping and that a notch 49 is formed at the lower end of such space to allow lubricant to flow past head 23.

In order to cause a substantial part of the oil to flow laterally of the arm and thereby avoid excessive lubrication at the ends, the two ears 42 and 43 are formed with registering transverse openings 50 and 51, and these openings may be formed by punching the metal at the same time that the laminations are stamped from sheet metal. At this point, it may be mentioned that the ears may be bent initially when the ears are formed in substantially the same manner as described in the copending application for patent, Serial No. 560,532. The openings 50 and 51 may vary in size and location and may be varied in location vertically so as to vary the location of the bottoms thereof with respect to the bottom of the passage 44 between the projections.

It is evident that the sides of the openings act as dams preventing or governing flow of oil towards opposite ends of the arms and causing instead, lateral flow in substantial quantities. Hence, these lateral openings in conjunction with the variable width of the passage 44 between the ears effectively provides a means for governing the flow of lubricant to opposite ends of the arms. The grooves 45 and 46 in which the lubricant mainly flows to the ends of the arms, may be formed substantially as disclosed in the last mentioned copending application for patent.

Figure 3:
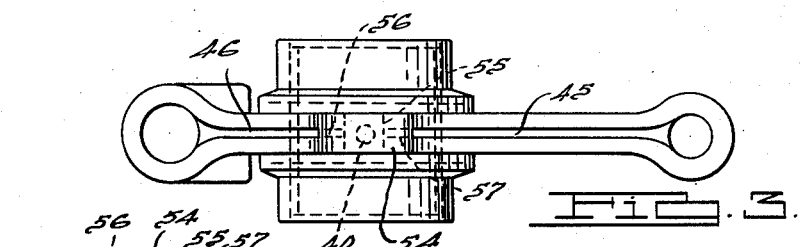
Fig. 3 is a similar plan view illustrating another form of the invention wherein the rocker arm is made from one piece or a forging.
Figures 4, 5, 6:
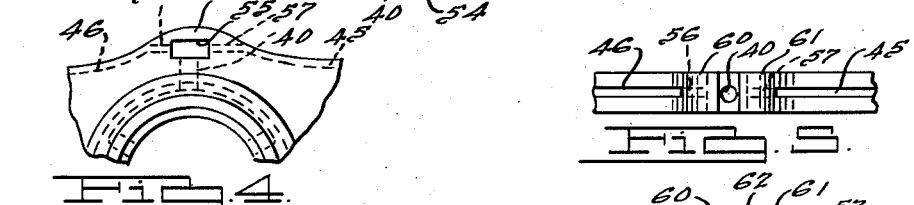
Fig. 4 is a fragmentary side elevational view of the structure shown by Fig. 3.
Fig. 5 is a fragmentary plan view illustrating still another form of the invention.
Fig. 6 is a side elevational view of the structure shown by Fig. 5.

In the construction shown by Figs. 3 and 4, instead of using a laminated type of arm, a one-piece arm is provided which may be formed from a forging or casting. In this case, a single ear or hump 54 is raised on the upper edge face of the arm in substantially the same position with respect to the opening 40 as the ears 42 and 43 are located, and this hump is provided with a transverse opening 55 corresponding substantially to the transverse openings 50 and 51. Lengthwise of the arm, the hump 54 has a bored opening 56 leading from the transverse opening 55 to the left groove 46 in the upper face of the arm while at the opposite side of the hump, a second bored opening 57 leads from the opening 55 to the groove 45.

The grooves 45 and 46 in this structure may be formed by a suitable cutting operation as will be readily understood, while the openings 56 and 57 may be formed by suitable drilling operations. The transverse opening 55 may be formed by a suitable punching operation and as indicated in connection with Fig. 1, the opening 55 may be varied in location so that its bottom may vary in vertical relation to the bottom of openings 56 and 57. It is evident that the oil will flow generally to the ends of the arms in substantially the same manner described in connection with Fig. 1 except that in this case, the lubricant will flow through openings 56 and 57 instead of through a passage formed between the separate ears.

In the construction shown by Figs. 5 and 6, a one-piece arm is again shown and in this case instead of having a transverse opening such as shown at 55 in Fig. 4, the hump is divided into longitudinally separated ears 60 and 61 by forming a transverse slot 62 entirely through the hump. The same bores 56 and 57 extend longitudinally of the arm through the ears and join the grooves 45 and 46. Here again the bottom of the slot may vary vertically with respect to the openings 56 and 57, and it might be noted also that the side walls of the slot converge upwardly so as to provide overhanging portions which help to prevent lubricant from flowing upwardly and over the ears and then towards the ends of the arm.

Figures 7, 8, 9:
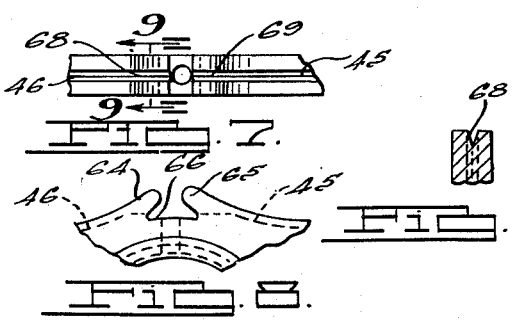
Fig. 7 is a fragmentary plan view of another form of the invention.
Fig. 8 is a side elevational view of the structure shown by Fig. 7.
Fig. 9 is a cross-sectional view taken substantially along the line 9—9 of Fig. 7.

In the construction shown by Figs. 7, 8, and 9, a single piece arm is again shown and is provided with longitudinally separated ears 64 and 65 separated by a transverse slot 66 substantially the same as the slot 62 in Fig. 6. In this construction instead of using the bores 56 and 57, the two ears 64 and 65 are formed with V-shape grooves 68 and 69, respectively, which lead from the slot 66 to the grooves 45 and 46. The grooves 68 and 69 may be readily formed by means of a cutting tool cutting lengthwise of the arm and forming a V-shaped groove similar in shape to the passage between the ears 42 and 43 in Fig. 2. It is evident in this one-piece type of arm that by forming a groove in the ears 64 and 65, the width of the grooves or passages 68 and 69 may be varied by bending the ear portions laterally apart in a variable manner so as to vary the amount of oil which flows through the grooves.

Although more than one form of the invention has been illustrated and described in detail, it will be apparent to those skilled in the art that various modifications may be made without departing from the scope of the claims.

What is claimed is:

1. An engine rocker arm having a hub portion, upstanding ear means on the upper edge of the arm intermediate its ends, defining lubricant damming and flow controlling means, said means for controlling the flow of lubricant to an end of the arm also including a passageway extending longitudinally through the ear means for allowing oil to flow to the end of the arm, an opening extending transversely through the ear means for allowing oil to spill laterally over a side of the arm, and an opening leading upwardly from the hub portion and operatively communicating with the passageway and transverse opening so that a part of the oil flows through the passageway to the end of the arm and a part spills through the transverse opening over the side of the arm, said transverse opening being formed below the upper edge face of the ear means so as not to interrupt the edge face of the latter.

2. An engine rocker arm having a hub portion, upstanding ear means on the upper edge of the arm intermediate its ends, defining lubricant damming and flow controlling means, said means for controlling the flow of lubricant to an end of the arm also including a passageway extending longitudinally through the ear means for allowing oil to flow to the end of the arm, an opening extending transversely through the ear means for allowing oil to spill laterally over a side of the arm, and an opening leading upwardly from the hub portion and operatively communicating with the passageway and transverse opening so that a part of the oil flows through the passageway to the end of the arm and a part spills through the transverse opening over the side of the arm, said longitudinally extending opening comprising a bore extending longitudinally through the ear means below its upper edge face.

3. An engine rocker arm having a hub portion, upstanding ear means on the upper edge of the arm intermediate its ends, defining lubricant damming and flow controlling means, said means for controlling the flow of lubricant to an end of the arm also including a passageway extending longitudinally through the ear means for allowing oil to flow to the end of the arm, an opening extending transversely through the ear means for allowing oil to spill laterally over a side of the arm, and an opening leading upwardly from the hub portion and operatively communicating with the passageway and transverse opening so that a part of the oil flows through the passageway to the end of the arm and a part spills through the transverse opening over the side of the arm, said transverse and longitudinal openings being located entirely beneath the upper edge face of the ear means.

4. An engine rocker arm having a hub portion, upstanding ear means on the upper edge of the arm intermediate its ends, defining lubricant damming and flow controlling means, said means for controlling the flow of lubricant to an end of the arm also including a passageway extending longitudinally through the ear means for allowing oil to flow to the end of the arm, an opening extending transversely through the ear means for allowing oil to spill laterally over a side of the arm, and an opening leading upwardly from the hub portion and operatively communicating with the passageway and transverse opening so that a part of the oil flows through the passageway to the end of the arm and a part spills through the transverse opening over the side of the arm, said transverse opening comprising a slot formed transversely through the ear means and the longitudinal opening comprising a bore located beneath the edge face of the ear means.

5. An engine rocker arm comprising a pair of laminations having an opening for receiving the shaft upon which the arm is to be mounted and a lubricant opening leading from said shaft opening to the upper edge face of the arm, and means for controlling the flow of lubricant from the upper end of the opening to one end of the arm and comprising laterally aligned and upstanding ears on the upper edge of the two laminations which are separated to form a continuous lubricant passageway extending longitudinally between the ears, said ears having transverse openings beneath their upper edge faces, said first opening intersecting said passageway intermediate its ends.

6. An engine rocker arm having a hub, an oil passage system formed in the arm and leading from the hub to an end portion of the arm to permit oil flow from the hub to said end portion, laterally spaced side walls defining a longitudinal part of said passage system, and means defining an escape channel open to atmosphere at one end for limiting the rate of possible oil delivery to said end portion of the arm by diverting excess oil, including a covering top wall bounding a part of said escape channel and limiting upward escape of oil, said escape channel intersecting said passage system at a position which is below the highest parts of said side walls.

JOHN R. WINTER, Jr.

REFERENCES CITED

The following references are of record in the file of this patent:

UNITED STATES PATENTS

| Number | Name | Date |
| --- | --- | --- |
| 1,278,195 | Noack | Sept. 10, 1915 |
| 2,176,083 | Leake | Oct. 17, 1939 |
| 2,288,831 | O'Harrow | July 7, 1942 |
| 2,345,822 | Leake | Apr. 4, 1944 |